(No Model.)

W. L. WALKER.
DRAFT POLE FOR VEHICLES.

No. 336,180. Patented Feb. 16, 1886.

WITNESSES

INVENTOR
William L. Walker.
By
Attorneys

UNITED STATES PATENT OFFICE.

WILLIAM LEWIS WALKER, OF BROOKS, CALIFORNIA.

DRAFT-POLE FOR VEHICLES.

SPECIFICATION forming part of Letters Patent No. 336,180, dated February 16, 1886.

Application filed October 2, 1885. Serial No. 178,846. (No model.)

*To all whom it may concern:*

Be it known that I, WILLIAM L. WALKER, a citizen of the United States, residing at Brooks, in the county of Yolo and State of California, have invented new and useful Improvements in Draft-Poles for Vehicles, of which the following is a specification, reference being had to the accompanying drawings.

My invention has relation to improvements in draft-poles for vehicles; and the novelty consists in the construction, combination, arrangement, and adaptation of the several parts for service, substantially as hereinafter fully set forth, and particularly pointed out in the claims.

My invention has primarily for its object to provide for the comfort and convenience of the driver or occupant of a vehicle, and to obviate the objections of the movements of the horse or animal from being communicated to the vehicle, which movements, in the case of carts and other two-wheeled vehicles, cause the body thereof to pitch or incline forward, thus giving the driver or occupant a very disagreeable movement or shaking.

A further object of my invention is the provision of means for carrying the above-named desiderata into effect which shall be simple, strong, and durable in construction, efficient in operation, cheap to manufacture, and capable of application to vehicles of different classes and at present in use.

Figure 1:
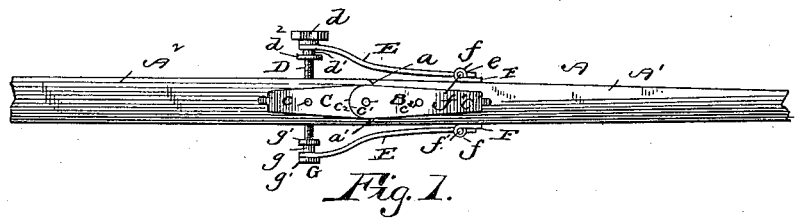
Figure 2:
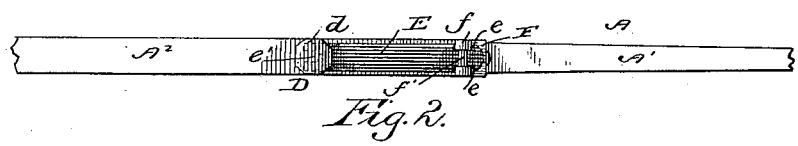
Figure 3:
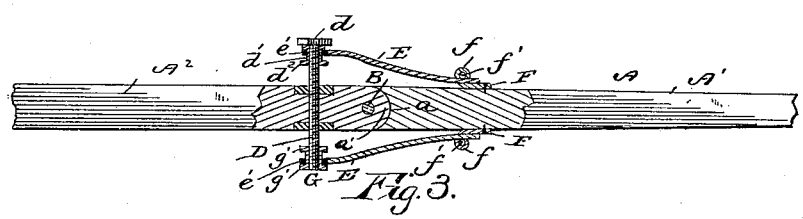
Figures 4, 5, 6:
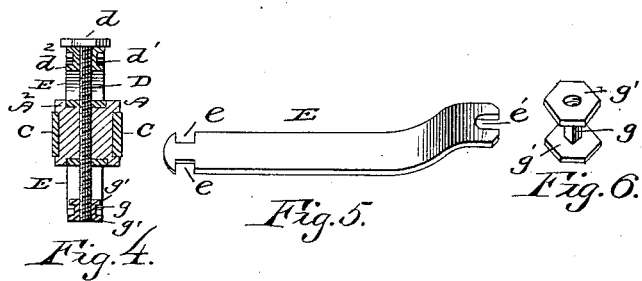

I have shown an embodiment of my invention in the accompanying drawings, in which Figure 1 is an elevation of a draft-pole or shaft embodying my invention. Fig. 2 is a plan view thereof. Fig. 3 is a longitudinal section, and Fig. 4 is a cross-section on the line $x\,x$ of Fig. 1, through the adjusting-bolt. Fig. 5 is a detail view of one of the springs. Fig. 6 is a detail of one of the sleeves with which the spring engages.

Like letters of reference indicate like or corresponding parts in all the figures of the drawings.

Referring to the drawings, A designates a draft-pole or shaft of a vehicle, which is made in two sections, $A'$ $A^2$, pivoted together so as to be capable of a vertical movement. The joint between the sections of the draft-pole or shaft is made near the rear end thereof, one of the sections having a concavity cut therein, as at $a$, and the other having a rounded projecting end, as at $a'$, fitting in the concave portion of its fellow section, so as to move freely therein, and pivoted by a cross bolt or pin, B, which passes through the rounded face of one of the sections, and bears at its ends in plates C C, secured to each side face of one of the sections, $A^2$, by means of bolts or rivets $c\ c$. The section $A'$ is also provided with plates, as at $C'$, which have rounded ends, as at $c'$, which receive rounded or concave ends $c^2$ of the plates C C, said plates $C'$ being secured to the section $A'$ in any preferable manner—as, for instance, by bolts or screws, (indicated by the letter $c^3$.)

D designates a threaded bolt passing through one of the sections of the draft-pole, preferably the section $A^2$, and bearing or working in a bushing extending entirely through the pole, or in nuts or plates having threaded apertures and fitted in recesses at each side of the pole and flush with the face thereof. The bolt D has an enlarged head or thumb-nut at one end, preferably the upper, as at $d$, a squared or rounded shoulder, $d'$, adapted to receive one end of a spring, E, and a collar, $d^2$, formed with or secured on said shoulder $d'$, and adapted to retain the spring E from displacement in one direction while it bears outwardly against the head of the bolt, which prevents it from becoming displaced. The springs E E are arranged upon the upper and lower faces of the draft-pole, and are so connected and arranged as to act in conjunction with the pole-sections to take up the jolting movements of the horse or animal and prevent them from becoming communicated to the vehicle, thus allowing the body thereof to remain in a horizontal position at all times. One end of each spring is secured upon the pole-section $A'$, leaving the opposite ends thereof free to bear outwardly and take up the strain, &c., as described. The secured end of the spring is notched on its side edges, as at $e$, and is fitted between upwardly-projecting lugs $f\ f$ of a plate, F, secured upon the lower and upper surfaces of one of the pole-sections, as $A'$, said lugs $f$ having a cross pin or bolt, $f'$, bearing therein and on the upper face of the notched end of the spring E, thus holding the same securely in position and against displacement, while permitting it to serve its function. The opposite or free end of the spring is notched or bifurcated, as at $e'$, the spring having its bifurcated end fitting between the collar $d^2$ and the head $d$, fitting on the shoulder $d'$ thereof, the notch in the end of the spring being of similar shape to the shoulder, which is preferably square, to prevent the bolt from turning after the tension of the springs have been regulated or set. The lower spring, E, fits, at its bifurcated end, on a squared portion, $g$, of a sleeve, G, and between two collars, $g'\,g'$, on said sleeve, which has a threaded socket or opening, and fits on the opposite end of threaded bolt D to the head $d$ thereof.

From the foregoing description, taken in connection with the drawings, it will be observed that the tension of the springs can be varied by simply adjusting the bolt D to suit the various requirements of the load sustained by the body of the vehicle. When the body is loaded to a considerable degree, the tension of the springs is increased, thus throwing the weight on the rear pole-section and springs, and relieving the horse or animal from any undue strain. When the vehicle is in motion, the strain and jar upon the shafts or pole and carriage are taken up by the springs, the forward section of the pole, being pivoted to the rear section, (which latter is connected to the vehicle-axle,) and carrying the springs, is acted on by the shoulders of the animal and vibrated vertically, or moved up and down. It will be seen that a very limited play or movement is transmitted from the front section of the draft-pole or shafts to the rear section thereof, the springs E receiving the vibrations and decreasing or modifying the jolt and jar upon the rear pole-sections.

From the foregoing it will be observed that a very limited amount of the movement caused by the animal is communicated to the vehicle-body by the shafts or draft-pole; that the body of the vehicle is maintained in a horizontal position at all times, and is almost, if not wholly, free from the annoying jerking or jolting movement so common to two-wheeled vehicles of the road-cart class, thus insuring comfort and convenience to the driver or occupant of the vehicle, and that the weight of the body can be adjusted and relieve the animal from strain, thus decreasing the draft or making it lighter and providing for easy movement. By adjusting the angle with which the pole-sections lie to each other, and maintaining them in this position, the front section can be elevated or lowered to suit the height of the horse, and the various conditions of load and draft can be complied with.

My device is simple, strong, and durable in construction, efficient and automatic in operation, cheap to manufacture, can be applied to vehicles of any class drawn by animals, and fills a long-felt want in vehicles of the road-cart class.

Modifications in the form and proportion of parts and details of construction can be made without departing from the principle or sacrificing the advantages of my invention, the essential feature of which is a draft-pole or shaft made in two sections coupled together, and having means for holding them at an angle or in alignment, while permitting them to move.

Having thus fully described my invention, what I claim as new, and desire to secure by Letters Patent, is—

1. In a sectional draft-pole, the combination of springs secured to one section of the pole, a threaded bolt secured in the other section of said pole, and vertically-adjustable sleeves on said bolt, to which the free ends of the springs are connected, substantially as described.

2. The combination of the rear pole-section, $A^2$, the front section, $A'$, pivoted thereto, bent springs secured to the section $A'$, exteriorly thereto, on its upper and lower sides, and a retaining-bolt secured in the section $A^2$, and having the free ends of the springs connected thereto, substantially as described.

3. The combination of the section $A^2$, having a convex socket in its end, the section $A'$, seated in the socket and pivoted to the said section $A^2$, exterior springs secured at one end thereof to one of the sections above and below the same, and a retaining-bolt secured in the other section, and having the free ends of the springs detachably connected thereto, substantially as described.

4. The combination of the draft-pole sections pivotally connected together, a threaded bolt, D, secured in one of the sections, vertically-adjustable sleeves mounted on the bolt and provided with squared portions, and springs secured to one of the sections, and having their free notched ends engaging the squared portions of the sleeves, substantially as described.

5. In a draft-pole or shaft, the combination of the section $A^2$, adapted to be connected to a vehicle, a front section having a rounded or convex end fitting in a concavity in the rear section, $A^2$, plates C C', connected to the pole-sections, springs E, having notched ends, a cross-bolt, D, having a collar, $d^2$, and shoulder $d'$, a sleeve, G, having collars $g'$, and plates F, having lugs $f\,f$ and pin $f'$, all arranged and adapted to serve as set forth.

In testimony that I claim the foregoing as my own I have hereto affixed my signature in presence of two witnesses.

WILLIAM LEWIS WALKER.

Witnesses:
PATRICK MCLAUGHLIN,
H. H. SMITH.